US005175709A

United States Patent [19]

Slayton et al.

[11] Patent Number: 5,175,709

[45] Date of Patent: Dec. 29, 1992

[54] ULTRASONIC TRANSDUCER WITH REDUCED ACOUSTIC CROSS COUPLING

[75] Inventors: Michael H. Slayton; Leroy A. Kopel, both of Tempe, Ariz.

[73] Assignee: Acoustic Imaging Technologies Corporation, Phoenix, Ariz.

[21] Appl. No.: 595,970

[22] Filed: Oct. 11, 1990

Related U.S. Application Data

[63] Continuation-in-part of Ser. No. 527,078, May 22, 1990, abandoned.

[51] Int. Cl.[5] .............................................. G01S 15/00

[52] U.S. Cl. ...................................... 367/90; 310/326; 367/162

[58] Field of Search ............... 310/322, 324, 325, 327, 310/334, 337, 800, 326; 367/90, 94, 152, 155, 157, 160, 161, 162; 128/662.01, 662.04, 663.01

[56] References Cited

U.S. PATENT DOCUMENTS

| | | | |
|---|---|---|---|
| 4,672,591 | 6/1987 | Breimesser et al. ................ | 367/152 |
| 4,890,268 | 12/1989 | Smith et al. ..................... | 367/155 X |

OTHER PUBLICATIONS

The Role of Piezocomposites in Ultrasonic Transducers, by Wallace Arden Smith, 1989 Ultrasonic Symposium, 755–766.

*Primary Examiner*—Brian S. Steinberger
*Attorney, Agent, or Firm*—Christie, Parker & Hale

[57] ABSTRACT

A continuous wave driven ultrasonic transducer for determining doppler frequency shift in reflected ultrasonic pressure waves in which the transmitter and receiver sections are constructed of a composite core having a plurality of segments of piezoelectric material separated by acoustic suppression material. Also disclosed is a method of reducing acoustic and mechanical cross coupling between piezoelectric transmitter and receiver sections of an ultrasonic transducer by arranging segments of piezoelectric material in a lateral array, and separating the piezoelectric segments with ultrasonic acoustic suppression material to produce a composite transducer core of reduced acoustic and mechanical cross coupling.

3 Claims, 2 Drawing Sheets

ULTRASONIC TRANSDUCER WITH REDUCED ACOUSTIC CROSS COUPLING

CROSS REFERENCE TO RELATED APPLICATIONS

This is a continuation-in-part of application Ser. No. 07/527,078; filed May 22, 1990 and now abandoned.

BACKGROUND OF THE INVENTION

Continuous-wave-driven ultrasonic transducers have been used to measure velocity in changing flow patterns of flowing liquids by determining Doppler frequency shift in reflected ultrasonic pressure waves. Ultrasonic transducers of the type which have been used for this purpose are shown in FIGS. 1 and 2. As can be seen, they comprise electrically separated, solid piezoelectric material which serve as transmitters and receivers of ultrasound.

Commonly used piezoelectric materials, also useful in accordance with the present invention, are composites of piezo-ceramic and polymer. Typical of such materials are polymeric composites of lead-zirconate-titanate, lead-meta niobate and modified lead titanate.

To measure characteristics of flowing liquids, a high signal-to-noise ratio is required. Unfortunately, one of the major sources of noise in such devices is the cross coupling (also known as "cross talk") between transmitters and receivers. Excessive cross coupling results in reduced accuracy of measurements. This is especially undesirable where such devices are employed for medical applications since the erroneous results reduce diagnostic reliability.

SUMMARY OF THE INVENTION

The present invention relates to an ultrasonic transducer with reduced cross coupling between transmitter and receiver. In particular, the invention is directed to reducing undesirable cross coupling by providing an ultrasonic transducer with a novel, composite core.

In accordance with one embodiment of the present invention, an ultrasonic transducer is provided which comprises a composite transducer core having a transmitter section and a receiver section. Each section is comprised of a plurality of laterally disposed layers or segments of piezoelectric material and a plurality of laterally disposed separation layers or segments of acoustic suppression material interposed between adjacent piezoelectric layers or segments. The separation layers comprise ultrasonic wave suppression material which, when disposed between piezoelectric segments in the transmitter and receiver sections produce a composite core, with reduced cross coupling or "cross talk" in the lateral or radial direction. The separating layers or segments may comprise such acoustic suppression material as air, G-10 or FR-4 fiber glass or electrically insulating epoxy or combination of thereof.

An important application of the ultrasonic transducer, as mentioned above, is to measure blood-flow characteristics. For example, in making measurements of blood-flow velocity, the Doppler frequency shift is determined from reflected ultrasonic pressure waves. The ultrasonic transducer transmits continuous waves to the area under investigation and the receiver receives the ultrasonic reflections to determine Doppler phase frequency shifts.

One problem, which may be encountered by the use of an ultrasonic transducer device, is the difference in impedance between the transducer and water or human body tissue. To alleviate this condition, a matching impedance layer is advantageously disposed on the surface of the transducer facing the fluid flow, which has an impedance between that of the transducer and the body tissue. Use of such a matching layer reduces the magnitude of the difference in impedance. An additional benefit of the ultrasonic transducer in accordance with the invention is that the transducer core has a lower acoustic impedance than conventional configurations, thereby making it easier to match acoustically to human body tissue.

Materials useful as impedance matching layers include epoxy of different compositions, such as "Hysol". However, the use of a matching layer as well as the selection of a particular material depends on the fluid, fluid flow characteristics to be measured, and environment of use, as is well known in the art.

In a preferred embodiment of the invention, there is provided a continuous-wave-driven, ultrasonic transducer useful in measuring characteristics of a flowing liquid, such as blood, by means of determining Doppler frequency shift in reflected ultrasonic waves, which comprises a transducer core having a transmitter section and a receiver section, each section comprising a plurality of laterally disposed segments of piezoelectric material electrically connected in parallel; the piezoelectric segments being separated by ultrasonic wave suppression material. An impedance matching layer may be advantageously provided on the surface of the transducer core facing the fluid flow which has an impedance value between the impedance of the transducer core and the impedance of the fluid whose flow characteristics are to be measured.

Electrical connection of respective arrays of piezoelectric segments in the transmitter and receiver sections may be achieved by use of a simple wire connection or by use of a metalized layer that can serve as an electrode to facilitate electrical connection of the transducer to a suitable continuous wave generator. Where a metalized layer is used, it may comprise electroless nickel, vacuum deposited gold, or other known material suitable for this purpose. Separate metalized layers may extend across each of the transmitter and receiver sections on one end surface thereof. The opposite end surface of the transmitter and receiver sections may be electrically connected, by a metalized layer or, preferably, a simple wire extending across the piezoelectric segments. The impedance matching layer which should be electrically non-conductive, extends across the entire surface of the transducer's composite core.

The transducer core thus comprises a transmitter and receiver section each of which includes a plurality of laterally disposed segments of piezoelectric material. Adjacent piezoelectric segments are separated by a separation layer of ultrasonic wave suppression material and the impedance matching layer extends across one surface of the transducer core. The resulting transducer has reduced acoustic and mechanical cross coupling between transmitter and receiver in the lateral direction.

In an alternative embodiment, the piezoelectric material in the transmitter and receiving sections may comprise "diced" segments of piezoelectric material instead of laterally extending full-length layers. In this construction, the core may resemble a "checkerboard" pattern of piezoelectric segments, each of which is acoustically separated from adjacent segments in the same manner as described above. Metalized material or other electrical connection means is also applied to opposite surfaces of each piezo segment, with each surface being of opposite polarity, just as in the previously described embodiment, and connected to a continuous wave generating source.

It will be noted that the terms "layers" and "segments" as used herein to describe the piezoelectric material in the core, are interchangeable. The intention is that term "segment" is broad enough to encompass laterally extending layers of piezoelectric material which may either be as long as the diameter of the transducer core or of lesser length. Thus, for example, in accordance with the invention a segment may comprise one entire lateral layer or slice, or one of two or more sections which will form an entire lateral layer. In the alternative embodiment described above, each lateral layer may be comprised of two or more segments, thus forming a "checkerboard" pattern.

DESCRIPTION OF THE PREFERRED EMBODIMENTS

Both prior art and preferred embodiments of the invention are shown in the accompanying drawings, wherein like numerals are used to refer to similar parts.

Figure 1:
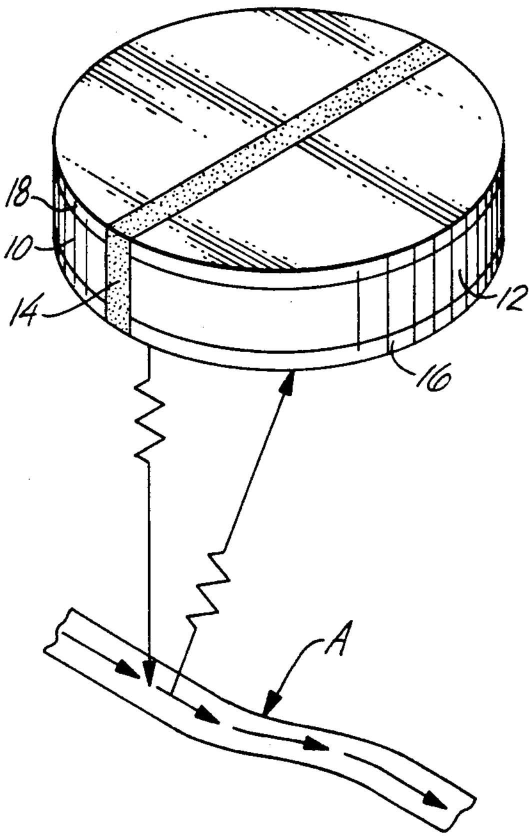
PRIOR ART Fig. 1
FIG. 1 is a partial isometric view of a continuous-wave Doppler ultrasonic transducer known to the prior art.
Figure 2:
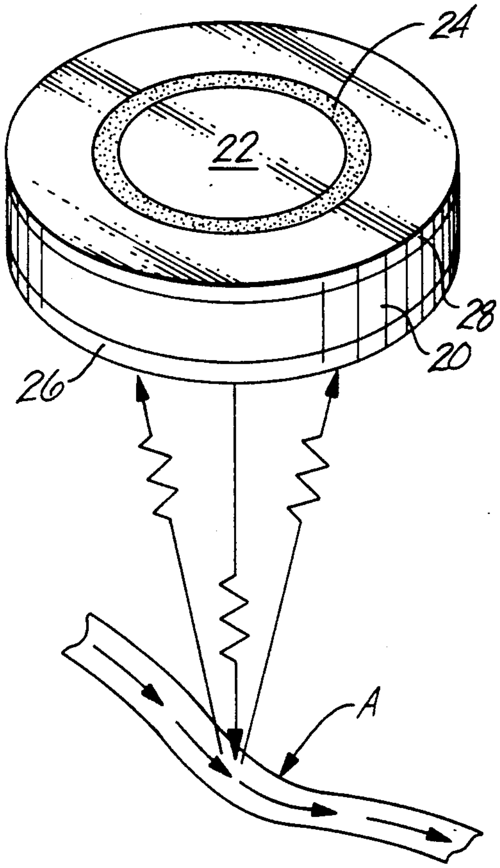
PRIOR ART Fig. 2
FIG. 2 is a partial isometric view of another embodiment of a continuous-wave Doppler ultrasonic transducer also known to the prior art.

As can be seen in FIGS. 1 and 2, conventional ultrasonic Doppler transducer configurations comprise a piezoelectric transmitter and receiver separated by a an electrically non-conductive separation layer. In the embodiment of the prior art described in FIG. 1, the transmitter and receiver segments of piezoelectric material, 10 and 12, respectively, comprise semicircular cylindrical segments. Non-conductive separation material 14 is disposed between them and electrically conductive metalized layers (not shown), are applied to the transmitter and receiver sections for electrical connection to a C.W. source and a display. Because the transducer generally has an acoustic impedance much greater than the impedance of the body tissue, represented in FIG. 1 by the liquid blood flow A, an impedance matching layer 16 is employed to provide an impedance value between the impedance of the ultrasonic transducer core and the fluid whose velocity or other characteristics are to be measured. A backing layer 18 is employed on the side of the transducer facing away from the fluid.

A similar prior art arrangement is described in FIG. 2, except that, in this embodiment, an annular piezoelectric material 20 serves as a receiver surrounding a central core 22 of piezoelectric material which serves as a transmitter, and the two segments are separated from each other by annular non-conducting separation layer 24. Metalized layers or other electrical connections, not shown, provide means to electrically connect the transmitter and receiver to a C.W. source. A matching layer 26, similar to 16 in FIG. 1, is used for the same purpose as discussed in connection with FIG. 1. A backing layer 28 similar to layer 18 in FIG. 1 is used for the same purpose. Also as in FIG. 1, FIG. 2 depicts the transmission of ultrasonic wave energy and the reflection back from the liquid flow A.

Figure 3:
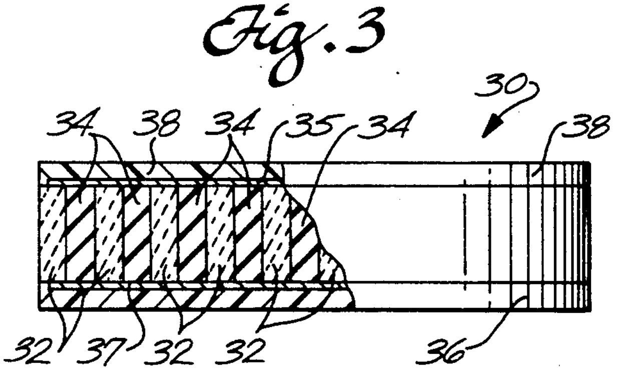
FIG. 3 is a side view, partially in section, of the composite core that is used to form the transmitter and receiver sections of the ultrasonic transducer in accordance with the present invention.

In contrast to the construction described in FIGS. 1 and 2, the ultrasonic transducer in accordance with the invention comprises transmitter and receiver sections constructed of a composite transducer core as shown in FIGS. 3, 4, 5 and 6. As can be seen in FIG. 3, the composite core 30 comprises lateral layers or segments of piezoelectric material 32. Adjacent segments of piezoelectric material 32 are separated with ultrasonic wave suppression material 34. In the construction described, the piezoelectric and separation material are disposed transversely along the lateral, or radial, direction. A suitable electrical ground connection is made between all the piezoelectric segments in the core by a narrow metalized layer 37 that covers one of the end surfaces of the core in contact with all of layers 32. A narrow metalized layer 35 is applied to the other end surface of the core in contact with all of layers 32. Conductive layers 35 and 37 serve as transducer electrodes, electrically connecting layers 32 together in parallel to form in effect a single ultrasonic wave transducer. In the preferred embodiment, an impedance matching layer 36 is also provided which extends across the end surface of the core over layer 37 and a backing layer 38 extends across the end surface of the core over layer 35.

Figure 4:
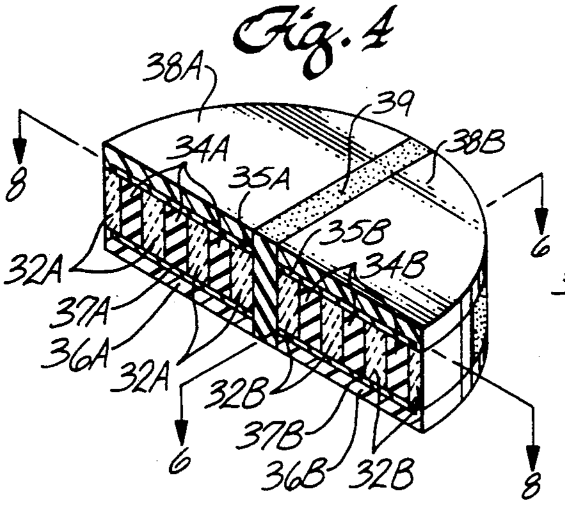
FIG. 4 is a partial view, with cut away section, of a continuous-wave ultrasonic transducer of the type shown in FIG. 1 incorporating a composite core in a parallel pattern according to one embodiment of the invention.
Figure 5:
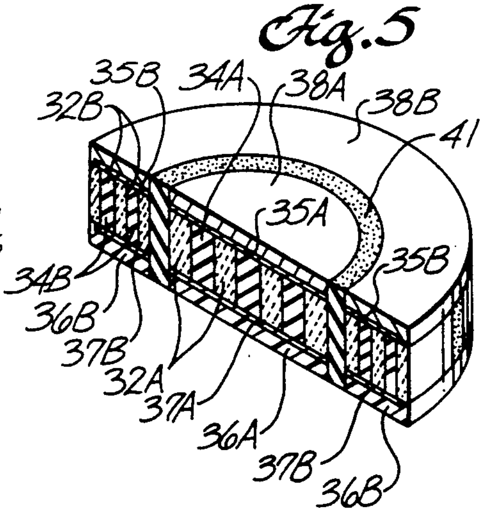
FIG. 5 is a partial view, with cut away section, of a continuous-wave ultrasonic transducer of the type shown in FIG. 2 incorporating a composite core in a parallel pattern according to the one embodiment of the invention.

The core shown in FIG. 3 is used as the transmitter and as the receiver in the otherwise known ultrasonic continuous wave Doppler transducers, as illustrated in FIGS. 4 and 5. In FIG. 4., the transducer has a diametrical separation layer 39 that acoustically and electrically isolates the transmitter from the receiver. In FIG. 5, the transducer has an annular separation layer 41 that acoustically and electrically isolates the transmitter from the receiver. Separation layers 39 and 41 are preferably thicker than layers 34 and extend through and divide the impedance matching layer into layers 36A and 36B and the backing layer into layers 38A and 38B. Layers 35A and 37A form the electrodes of the transmitter and layers 35B and 37B form the electrodes of the receiver. Layers 39 and 41 could be the same material as or different from layers 34, so long as they have electrically insulative and acoustic suppressive properties.

Figure 8:
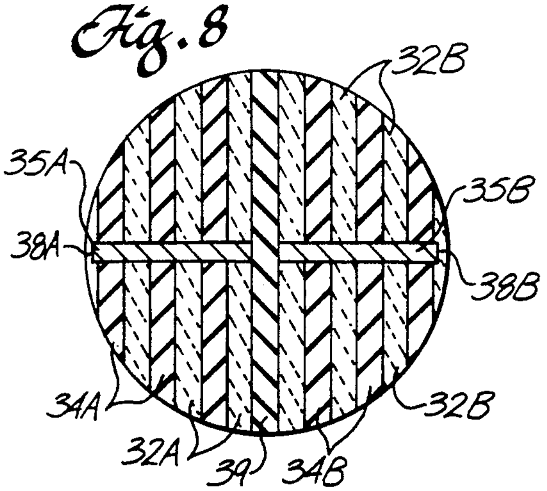
FIG. 8 is a sectional view, through plane 8—8 in FIG. 3, showing an ultrasonic transducer with a composite core and, in particular, the electrode connections.

As shown in FIG. 8, the layers 32A and 32B of piezoelectric material in the transmitter and receiver sections are connected, together by wire like electrode layers 35A and 35B, respectively. Layers 37A and 37B would be similarly connected to the other sides of layers 32A and 32B, respectively.

Since measurements of blood flow characteristics to determine velocity and other patterns by Doppler frequency shift in reflected ultrasonic pressure waves requires high signal-to-noise ratios, minimizing cross coupling or cross talk between transmitter and receiver, as is possible with the present invention, is especially important. By making transmitters and receivers from a plurality of piezoelectric segments separated by acoustic suppression material such as polymer epoxy, the continuous wave Doppler ultrasonic transducer possesses reduced acoustic and mechanical cross coupling between the transmitter and receiver. It is believed that the mechanism for the reduction in the cross coupling is the restricted mechanical motion and increased energy absorption in the radial direction.

It is also noted that the continuous-wave Doppler ultrasonic transducer of the invention provides the additional benefit of lower acoustic impedance within the transducer core. It is thus easier to acoustically match the transducer core to water or human body tissue. Manufactured prototypes of the invention have shown improvements, that is, reduction in cross coupling as compared to traditional ultrasonic transducers, of as much as 6 dB to 15 dB without deterioration in other performance characteristics.

Figure 7:
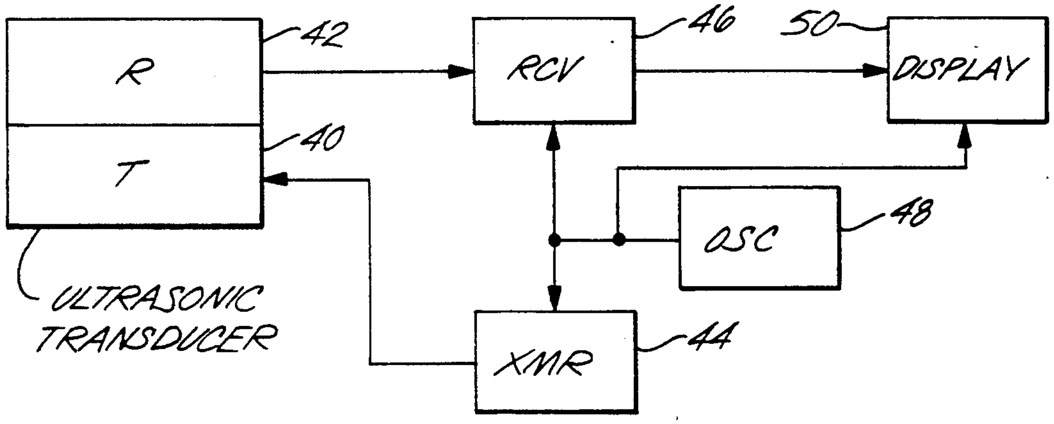
FIG. 7 is a schematic diagram showing the system in which the ultrasonic transducer is used.

A suitable system for using the ultrasonic transducer is described in FIG. 7 which shows the respective transducer sections 40 and 42 connected to a transmitter and receiver 44 and 46, respectively. An oscillator 44, which generates continuous waves, is connected to transmitter 44 for conversion to an ultrasonic signal and is connected to receiver 46 to detect the Doppler frequency shift. The receiver 46 is connected to a suitable display 50, such as a CRT, to display a representation of the Doppler frequency shift.

A convenient method of making an ultrasonic transducer in accordance with the invention as, for example, may be used in medical applications, is to slice the piezoelectric segments of the transmitter and receiver sections of the transducers shown in FIG. 1 into parallel lateral slices, such as shown in FIG. 3. These slices may then be arranged in a lateral array separated from each other with acoustic suppression material to form a composite core for the transmitter and receiver sections. In a similar manner, it is possible to construct a transducer of the type, or general configuration shown in FIG. 2, by first slicing a cylindrical piece of piezoelectric material and subsequently making a circular cut through the lateral slices and inserting acoustic suppression material between the annular outer section and the inner cylindrical section and between the slices. In both of the foregoing examples, the lateral direction will be equivalent to the radial direction of the transducer core. By electrically connecting the piezoelectric segments in the respective transmitter and receiver sections in the transducer core to supply a continuous-wave energy, continuous-waves of electrical impulses will create the necessary voltage field between the opposite surfaces of the transducer, and ultrasonic wave energy will be radiated transversely from the plane of the transducer toward the fluid flow under investigation. Although there will be some ultrasonic wave energy that radiates radially or laterally from each piezoelectric transmitter segment to a receiving segment, since each piezoelectric segment is separated from an adjacent segment, by acoustic suppression material, cross coupling between transmitter and receiver is significantly reduced in total, thereby improving the efficiency of the transducer. Since the layers 39 and 41 do not contribute to the transducer properties, i.e., acoustic impedance, electrical impedance, electromechanical coupling, etc., their thickness can be determined independent of layers 34 to increase cross-talk suppression.

Figure 6:
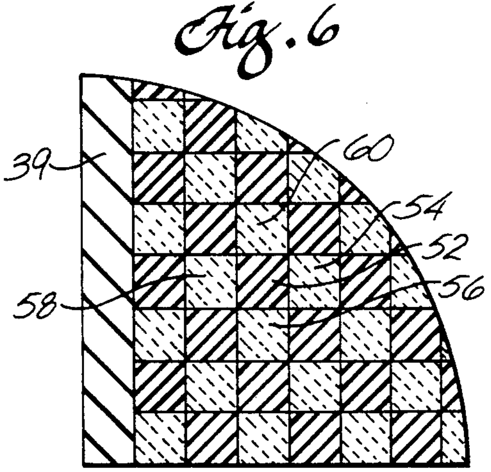
FIG. 6 is a partial view, with cut away section through a plane such as 6—6 in FIG. 4 showing an ultrasonic transducer with a composite core in a "checkerboard" pattern according to another embodiment of the invention.

As an alternative embodiment to the core described above, instead of using laterally extending layers, the piezoelectric material of the transmitter and receiver composite cores may be diced in perpendicular planes into rectangular blocks to form a checkerboard pattern, such as shown in FIG. 6. In this embodiment, each block 52 of piezoelectric material abuts four blocks 54, 56, 58, and 60 of wave suppression material. Of course, as in all other configurations, separate electrical connections are effected to the opposite surfaces of the piezoelectric blocks, as for example, by conductive layers coextensive in area with the respective transmitter and receiver.

In addition to the foregoing, extruded rods of piezoelectric material impregnated with epoxy may be assembled into the desired array. For example, the extruded rods can be placed side-by-side in a suitable configuration to form the composite cores as has been described in connection with laterally deposed layers or diced segments of piezoelectric material.

It is apparent from the foregoing that various changes and modifications to the invention may be made without departing from the spirit thereof.

Accordingly, the scope of the invention should be determined only by the appended claims, wherein what is claimed is:

1. A continuous wave Doppler transducer comprising:

a transmitter having side-by-side segments of piezoelectric material, ultrasonic wave suppression material interposed between the segments, and means for connecting the segments in parallel;

a receiver having side-by-side segments of piezoelectric material, ultrasonic wave suppression material interposed between the segments, and means for connecting the segments in parallel; and a non-conductive separation layer interposed between the transmitter and receiver to acoustically and electrically isolate the receiver from the transmitter.

2. The transducer of claim 1, in which the separation layer is thicker than the suppression material.

3. A method of reducing cross coupling in a continuous wave ultrasound Doppler system having a continuous wave ultrasonic oscillator and an ultrasonic wave receiver for detecting Doppler shift comprising the steps of:

arranging a first plurality of segments of piezoelectric material in spaced apart side-by-side relationship;

interposing ultrasonic wave suppression material between the first plurality of segments;

connecting the first plurality of segments in parallel;

arranging a second plurality of segments of piezoelectric material in spaced apart side-by-side relationship;

interposing ultrasonic wave suppression material between the second plurality of segments;

connecting the second plurality of segments in parallel;

interposing a non-conductive separation layer between the transmitter and the receiver to acoustically and electrically isolate the receiver from the transmitter;

connecting the oscillator to the first plurality of segments in parallel; and connecting the second plurality of segments in parallel to the receiver.

* * * * *